United States Patent
Novikov et al.

[15] 3,693,246
[45] Sept. 26, 1972

[54] BRAZING SOLDER

[72] Inventors: Vladimir Vasilievich Novikov, ulitsa Kachalinskaya, 9, kv. 72; Alexandr Ivanovich Gubin, B. Naberezhnaya ulitsa, 25/1 kv. 111; Vasily Mikhailovich Sorokin, Spartakovskaya ulitsa, 20, kv. 66, all of Moscow, U.S.S.R.

[22] Filed: Nov. 17, 1970

[21] Appl. No.: 90,452

[52] U.S. Cl. .................29/504, 75/134 C, 75/159, 75/161
[51] Int. Cl. .............................................B23k 31/02
[58] Field of Search.....75/134 C, 134 N, 134 R, 159, 75/166 D, 166 E; 29/504

[56] References Cited

UNITED STATES PATENTS 3,577,234    5/1971    Boughton et al. ............75/159

FOREIGN PATENTS OR APPLICATIONS 1,792    7/1861    Great Britain ...........75/134 C Primary Examiner—L. Dewayne Rutledge
Assistant Examiner—J. E. Legru
Attorney—Waters, Roditi, Schwartz & Nissen

[57] ABSTRACT

The invention relates to brazing solders applied for brazing parts made of steel, cast iron, copper and nickel alloys, as well as of noble metals and alloys having their melting point lying above 800° C.

The invention is characterized in that the brazing solder proposed therein, has the following weight percent composition: Cu, 20–65; Mn, 15–35; Ag, 15–25; and Ni, 5–20; Zn, 0–15.

5 Claims, No Drawings

BRAZING SOLDER

This invention relates to hard or brazing solders for brazing articles made of steel, cast iron, copper and nickel, as well as of noble metals and alloys having their melting point above 800° C.

The most extensively used solder for brazing the aforementioned metals, particularly stainless steels including high-strength ones, is a brazing solder of the following composition: Ag, 92 percent; Cu, 7.5 percent; and Li, 0.2–0.5 percent which contributes to preservation of adequate mechanical characteristics of brazed metals and obtaining brazed joints able to withstand corrosion attack under any climatic conditions.

However, said currently employed brazing solder is highly expensive due to the considerable silver content therein. Application of said solder under mass production schedule at high consumption rate thereof per article produced entails a considerable consumption of silver which is uneconomical.

Moreover, when brazing high-strength steels alloyed with aluminum, chromium and titanium with said solder to provide good wettability and spreadability thereof, requires the use of shielding atmosphere featuring a high degree of freedom from oxygen and moisture, as well as the employment of the gaseous fluor-containing brazing fluxes. Purification of shielding atmosphere (commercially pure argon or helim) from oxygen is attained by using oxygen absorbents such as hot titanium or zirconium sponge, said atmosphere is freed of moisture by means of silica gel, both said absorbents and said silica gel being arranged across in the flow path of shielding gases.

Thus, the application of said conventional brazing solder makes the cost of brazed parts considerably higher and complicates the technological procedure of brazing. Besides, the residual fluor-containing fluxes are impossible to eliminate from the surface of the parts brazed in closed or "blind" spaces said residual fluxes affect adversely the corrosion-resistance of the metal being brazed and the brazed joints thereof.

It is an object of the present invention to provide a less expensive brazing solder possessing the advantageous features of the solder used currently.

Another object of the present invention is to provide a brazing alloy of the character set forth above which would not require the use of a shielding atmosphere purified to a high degree of cleanness, nor the use of gaseous fluor-containing brazing fluxes.

These and other objects are achieved by the provision of a brazing solder having the following weight percentage composition ranges, according to the invention:

Cu 20–65
Mn 15–35
Ag 15–25
Ni 5–20

The preferred weight percentage composition range of the brazing solder is as follows:

Cu 41–49
Mn 21–23
Ag 20–23
Ni 10–13

Up to 15 wt. percent of Zn is expedient to be introduced into the composition of said brazing solder. Incorporating of Zn into the present solder composition conduces to a reduced attaching of the metal brazed by the liquid solder and diminishes the melting point thereof.

It is likewise expedient that the following constituents be incorporated into the composition of the present solder (in wt. percent):

Si 0.5 max.
P 0.3 max.
B 0.3 max.

Introducing of said components into the herein-disclosed solder increases the flowability thereof and contributes to a better wetting of stainless steels alloyed with aluminum, chromium and titanium which are liable to formation of stable oxide films on said steel surface when heated.

The present invention provides silver consumption to be reduced by one fourth, makes it possible to dispense with the purification of shielding gases and with the use of gaseous fluor-containing brazing fluxes, and to obtain high-strength brazed joints.

Given below are some examples of using brazing solders made according to the present invention.

EXAMPLE 1

When brazing with a solder of the following preferable weight percent composition:

Cu 44
Mn 23
Ag 22
Ni 11 parts made of chromium-nickel stainless steel alloyed with aluminum and titanium, sheet thickness being 1 mm, at a temperature of 950° C in the shielding atmosphere of commercially pure argon without involving brazing fluxes, brazed joints therein are found to have shearing strength of 34.5 kg/mm$^2$ at room temperature (20° C) and of 23.5 kg/mm$^2$ at 400° C.

After having stayed within 1 month under tropical climate conditions the brazed joints show the strength thereof remaining unaffected.

Parts brazed with the conventional solder the strength of brazed joints is found to be 23 kg/mm$^2$ at 20° C and 13.0 kg/mm$^2$ at 400° C.

EXAMPLE 2

When brazing parts under the same conditions as stated in Example 1, with a solder of a composition corresponding to the above specified lower limit of weight percentage, viz., Cu 65
Mn 15
Ag 15
Ni 5 the brazed joints are found to possess a shearing strength equal to 23 kg/mm$^2$ at 20° C and to 18.5 kg/mm$^2$ at 400° C.

EXAMPLE 3

When brazing parts under the same conditions as described in Examples 1 and 2 safe for brazing temperature which equals to 1,000° C, with a solder having a composition corresponding to above specified upper limit of weight percentage, viz., Cu 20

Mn 35
Ag 25
Ni 20 the brazed joints are found to possess a shearing strength equal to 38.5 kg/mm² at 20° C and to 28.5 kg/mm² at 400° C.

As it is evident from comparison of the results of Examples 1, 2 and 3 the solder of Example 3 has a somewhat higher strength than the solders of Examples 1 and 2, and because it features a higher brazing temperature, due to the influence of nickel content therein which is always practicable for brazing high-strength stainless steels which are intolerant for being heated above the hardening temperature. Therefore, the solders according to this invention as specified in Examples 1 and 2 are recommended for brazing such steels.

Anticorrosive properties of the present brazing solder are ensured due to the introducing of Ag and Ni thereinto. Therefore, when brazed parts have to be operated under most adverse climatic conditions, e.g., under torrid climate with a high air humidity or under humid marine climate, it is recommendable to introduce silver according to the upper weight percentage limit, while the percentage content of Mn in the solder under such climatic conditions is recommended to be reduced since manganine is liable to affect the corrosion resistance of the brazed joint. The content of silicon, phosphorus and boron is varied in dependence with whether the metals being brazed contain elements that are liable to form stable exides thus hampering the spreading of the solder. Thus, for brazing steels alloyed with chromium, titanium and aluminum, a solder is preferred to be used containing Si, B and P in the above-specified ratio, whereas for brazing carbon steels, use can be made of a solder devoid of said components.

Zinc is incorporated for reducing the solder melting point and diminishing the stackability of the metal being brazed by the liquid solder. It is employed when brazing thin parts such as steel foil 0.03–0.05 mm thick, in which case the use should be made of the solders specified in Examples 1 and 2 containing 15 wt. percent of Zn. When brazing same steel foil, but 0.5 mm thick use is made of the above solder with a 5 wt. percent additive of Zn, and in the case of steel foil 1 mm thick and over, a zincless solder must be used.

The herein-proposed brazing solder does not differ from the heretofore used brazing solder in its production technology and in brazing technique with it, with the exception of that purifying the shielding gases from oxygen and moisture; and that the using gaseous fluor-containing fluxes can be dispensed with, when employing the present solder.

What is claimed is:

1. A brazing solder, consisting essentially of:
Cu 20–65 wt. percent
Mn 15–35 wt. percent
Ag 15–25 wt. percent
Ni 5–20 wt. percent
Zn 0–15 wt. percent 2. A brazing solder consisting essentially of:
Cu 41–49 wt. percent
Mn 21–23 wt. percent
Ag 20–23 wt. percent
Ni 10–13 wt. percent
Zn 0–15 wt. percent 3. The brazing solder as claimed in claim 1, into whose composition are introduced:
Si up to 0.5 wt. percent max.
P up to 0.3 wt. percent max.
B up to 0.3 wt. percent max.

4. A process for brazing steel, cast iron, copper, nickel, noble metals and alloys thereof said metals and alloys having a melting point above 800° C, comprising brazing the metals with a brazing alloy according to claim 1.

5. The process according to claim 4 wherein the brazing solder includes:
Si up to 0.5 wt. percent max.
P up to 0.3 wt. percent max.
B up to 0.3 wt. percent max.

* * * * *